United States Patent [19]

Ito et al.

[11] Patent Number: 4,677,954
[45] Date of Patent: Jul. 7, 1987

[54] METHOD AND SYSTEM INCORPORATING ZERO-CORRECTION FOR FUEL SUPPLY CONTROL FOR INTERNAL COMBUSTION ENGINE

[75] Inventors: Toshimitsu Ito; Akio Okamoto, both of Toyota, Japan

[73] Assignee: Toyota Jidosha Kabushiki Kaisha, Aichi, Japan

[21] Appl. No.: 837,403

[22] Filed: Mar. 7, 1986

[30] Foreign Application Priority Data

Mar. 11, 1985 [JP]  Japan .................................. 60-047868

[51] Int. Cl.$^4$ ............................................. F02D 41/00
[52] U.S. Cl. ..................................... 123/478; 123/482; 123/489
[58] Field of Search ............... 123/438, 440, 478, 480, 123/482, 489; 364/431.05

[56] References Cited

U.S. PATENT DOCUMENTS

| 4,140,088 | 2/1979 | de Vulpillieres | 123/478 |
| 4,223,644 | 9/1980 | Latsch et al. | 123/440 |
| 4,242,992 | 1/1981 | Kawamura et al. | 123/491 |
| 4,480,606 | 11/1984 | Kato et al. | 123/440 |

Primary Examiner—Andrew M. Dolinar
Attorney, Agent, or Firm—Parkhurst & Oliff

[57] ABSTRACT

An engine fuel supply system has a main conduit which supplies fuel into an intake passage, a means for regulating fuel flow through this main conduit through a range of values according to the value of a control signal with the fuel flow provided when the control signal is zero being a basic non zero value, a power conduit which selectively supplies fuel into the intake passage, and a means for opening or closing the power conduit. When the power conduit is closed: a basic value Sb for the main conduit control signal is determined according to engine operational parameters; a value Sn is added to Sb; a multiplicative correction is applied; and the main conduit control signal value is determined by subtracting Sn. But, when the power conduit is open: again, a basic value Sb for the main conduit control signal is determined according to engine operational parameters; Sn and a value Sp are added to Sb; a multiplicative correction is applied; and the main conduit control signal value is determined by subtracting Sn and Sp. Here, Sn represents the main conduit control signal value which would be required, in a virtual sense, for providing the basic main conduit flow value from a zero flow value, and the value Sp represents the incremental value of that control signal which would be required to increase the main conduit flow amount by an amount corresponding to the power conduit flow amount when open.

30 Claims, 3 Drawing Figures

METHOD AND SYSTEM INCORPORATING ZERO-CORRECTION FOR FUEL SUPPLY CONTROL FOR INTERNAL COMBUSTION ENGINE

BACKGROUND OF THE INVENTION

The present invention relates to the field of control of fuel supply for internal combustion engines, and more specifically relates to a method and system for fuel supply, which perform more accurate control of a variable fuel flow control means in a fuel supply system.

In the prior art, there is a known fuel supply system which incorporates a main fuel conduit which has at an intermediate position along it a flow regulation means such as a variable jet which can be set by a control system to any of a range of openings, and further incorporates a power fuel conduit which is controlled by a valve which is controlled by said control system to be either open or closed, in a binary manner; both of these fuel conduits supplying fuel to the intake passage of the engine. Such control systems are, for example, disclosed in Japanese Utility Model Laying Open Publication Ser. No. 55-83243 and Japanese Patent Laid Open Publication Ser. No. 57-12215, as well as in Japanese Patent Application Ser. No. 59-247923, made by an applicant the same as the assignee of the present patent application: it is not intended hereby to admit any of these matters as prior art to the present patent application except to the extent otherwise required by law.

SUMMARY OF THE INVENTION

Such a flow regulation means such as a variable jet is typically controlled by a means such as a stepper motor to open it from its base condition by an amount substantially proportional to a control signal supplied to said means. In order to achieve control precision and good response from the region when the control signal is small or zero, it is desirable to so arrange the flow regulation means that it passes a certain base flow amount of fuel to be mixed into the air flowing through the engine intake passage, even when the value of the control signal supplied to said flow regulation means is zero or substantially so. And, in such a case, as the value of said control signal increases from zero, the flow amount of fuel through said main fuel conduit will increase, typically in a substantially linear manner.

However, in such a system, the amount of fuel which is being supplied into the engine intake system is not directly proportional to the control signal being supplied to the flow regulation means, both because of the non zero base flow thus arranged to be provided through said flow regulation means when the control signal value is zero, and because of the fact that the power fuel conduit may possibly be opened by its control means. However, in a fuel supply system, the calculation by a control device of the amount of fuel to be supplied to the internal combustion engine is very conveniently performed by various multiplicative steps. For example, it is desirable to apply a multiplicative correction to the fuel supply amount to compensate for the effects of variation of intake air temperature and of variation of engine coolant temperature, as well as for the effect of acceleration and other effects. Such multiplicative correction is very convenient and computationally simple, as well as being quick and, in such a calculating means as a microcomputer, economical of storage. But, because of the non proportional relationship of the amount of fuel supplied into the engine intake system and the control signal supplied to the flow regulation means, such simple multiplicative correction control, if practiced, would introduce significant errors, and a wrong air/fuel ratio for the air-fuel mixture for the engine would likely result.

Further, there are per se known methods and systems which use so called feedback and learning control in such a system to compensate for deviation from proper and original characteristics due to the effects of manufacturing tolerances, alteration of system characteristics over a long service life, and weather conditions. However, again, such learning control is typically carried out by application of a multiplicative correction, and accordingly cannot properly be applied to a system of the type described above in which the amount of fuel supplied into the engine intake system is not directly proportional to the control signal supplied to the flow regulation means, for the same reason as described above.

Accordingly, it is the primary object of the present invention to provide a method for fuel supply control for an internal combustion engine, which avoids the above described problems.

It is a further object of the present invention to provide such a method for fuel supply control, which improves on the above described control method so as to obtain proper fuel amount correction calculation by the simple application of a multiplicative correction coefficient.

It is a further object of the present invention to provide such a method for fuel supply control, which similarly provides good feedback and learning control by such simple application of a multiplicative correction coefficient.

It is a yet further object of the present invention to provide a system for fuel supply control, which aids with the achievement of the above identified method objects.

According to the most general method aspect of the present invention, these and other objects are accomplished by a method for controlling an internal combustion engine fuel supply system comprising: (a) an intake passage; (b) a main fuel conduit which supplies fuel into said intake passage to be mixed with air flowing therethrough to provide air-fuel mixture for said internal combustion engine; (c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero; (d) a power fuel conduit which selectively supplies fuel into said intake passage to be mixed with said air flowing therethrough; and: (e) a means for regulating said power fuel conduit to be either open or closed, according to the value of a power fuel conduit control signal; comprising the steps of: (f) when said power fuel conduit is closed: (f1) a basic value Sb for said main fuel conduit control signal is determined according to engine operational parameters; (f2) a value Sn is added to said basic value Sb; (f3) a multiplicative correction is applied to the result of step f2; and: (f4) the value for said main fuel conduit control signal is determined by subtracting said value Sn from the result of step f3; and: (g) when said power fuel conduit is open: (g1) a basic value Sb for said main fuel conduit control signal is determined according to engine operational parameters; (g2) said value Sn and a value Sp are added to said basic value Sb; (g3) a multiplicative correction is applied to the result of step g2; and: (g4) the value for said main fuel conduit control signal is determined by subtracting said value Sn and said value Sp from the result of step g3; (h) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open; and, according to the most general system aspect of the present invention, these and other objects are accomplished by a system for controlling an internal combustion engine fuel supply system comprising: (a) an intake passage; (b) a main fuel conduit which supplies fuel into said intake passage to be mixed with air flowing therethrough to provide air-fuel mixture for said internal combustion engine; (c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero; (d) a power fuel conduit which selectively supplies fuel into said intake passage to be mixed with said air flowing therethrough; and: (e) a means for regulating said power fuel conduit to be either open or closed, according to the value of a power fuel conduit control signal; comprising: (f) a means for, when said power fuel conduit is closed: (f1) determining a basic value Sb for said main fuel conduit control signal according to engine operational parameters; (f2) adding a value Sn to said basic value Sb; (f3) applying a multiplicative correction to the result of step f2; and: (f4) determining the value for said main fuel conduit control signal by subtracting said value Sn from the result of step f3; and: (g) a means for, when said power fuel conduit is open: (g1) determining a basic value Sb for said main fuel conduit control signal according to engine operational parameters; (g2) adding said value Sn and a value Sp to said basic value Sb; (g3) applying a multiplicative correction to the result of step g2; and: (g4) determining the value for said main fuel conduit control signal by subtracting said value Sn and said value Sp from the result of step g3; (h) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

According to the present invention, all the corrections required to be applied to the amount of fuel supplied to the engine can be applied by simple multiplication, without generating any inaccuracies due to non proportionality of the signal supplied to the means for regulating fuel flow through said main fuel conduit and the actual amount of fuel supplied to the engine; and this is a major benefit as regards simplification. As will be understood from the following, further, the present invention has important subsidiary aspects as regards feedback or learning control, according to the output from an air/fuel ratio sensor provided to the engine.

BRIEF DESCRIPTION OF THE DRAWINGS

The present invention will now be shown and described with regard to the preferred embodiments of the system and the method thereof, and with reference to the illustrative drawings, which however should not be considered as limitative of the present invention in any way, since the scope of the present invention is to be considered as being delimited solely by the accompanying claims, rather than by any particular features of the disclosed embodiments or of the drawings. In these drawings:

DESCRIPTION OF THE PREFERRED EMBODIMENTS

Figure 1:
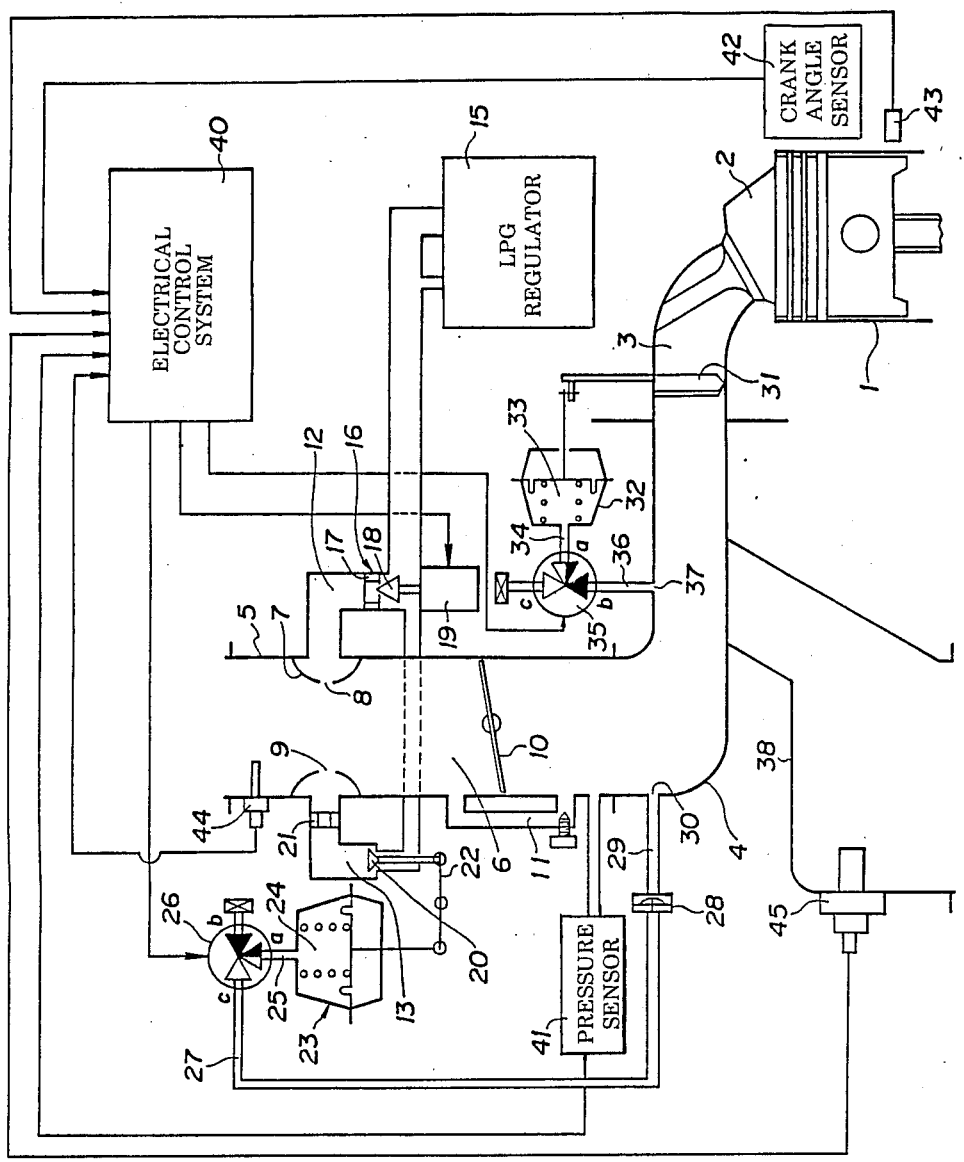
FIG. 1 is a schematic illustration showing the intake system of an internal combustion engine incorporating the preferred embodiment of the fuel supply control system of the present invention.

The present invention will now be described with reference to the preferred embodiments of the system and the method thereof. FIG. 1 shows schematically the construction of the intake system of an internal combustion engine (which exemplarily is an engine running on liquid petroleum gas, so called LPG) incorporating the preferred embodiment of the fuel supply system of the present invention, which practices the preferred method embodiment. In this figure, the reference numeral 1 denotes the internal combustion engine as a whole, and this engine has a combustion chamber 2 (only one such is shown in the figure) which sucks in air-fuel mixture, i.e. a mixture of air and liquid petroleum gas, through an intake port 3 from an intake manifold 4 which itself sucks said air-fuel mixture in from a mixer device 5. And 38 represents an exhaust manifold of the engine 1.

The mixer device 5 is constructed with an air intake passage or throat 6 which has a venturi portion 7, and a main fuel port 8 and a power fuel port 9 open into the air intake passage 6 in this venturi portion 7. Downstream of the venturi portion 7 in the air intake passage 6 there is provided an air flow rate control valve or throttle 10 which in this construction is a butterfly valve, and an idle bypass air passage 11 is provided for leading in air-fuel mixture around this throttle valve 10. The main fuel port 8 is communicated via a main fuel passage 12 and via a variable jet device 16 with an LPG regulator 15 of a per se known type, not further described herein, and thus is supplied with LPG at a flow rate controlled by said variable jet device 16. Similarly, the power fuel port 9 is communicated via a power fuel passage 13 and via a throttling element 21 and a power valve 20 (which is an ON/OFF valve which is either open or closed) with said LPG regulator 15, and thus either is supplied with LPG from said LPG regulator 15 by an amount determined by said throttling element 21, or not, as controlled by said power valve 20.

The variable jet device 16 controls the flow of LPG through the main fuel passage 12, and comprises a jet element 17 provided at an intermediate point in said main fuel passage 12 and a metering element 18 arranged to cooperate with said jet element 17 and to vary the effective opening thereof, i.e. the flow resistance therethrough, according to the longitudinal position of said metering element 18. This metering element 18 is mounted on a rod which is longitudinally driven by a stepper motor 19, which is driven by a signal supplied from an electrical control system 40, as will be more particularly described hereinafter. For example, the signal supplied to the stepper motor 19 can be a pulse signal, and said stepper motor 19 can drive the metering element 18 according to the number of pulses of said pulse signal, by, when the number of pulses is zero, moving to its initial position thereby positioning said metering element 18 quite close to said jet element 17, and thereafter, according to the number of pulses, driving said metering element 18 so as to progressively further open said jet element 17. Particularly, as can be understood by reference to the graph of FIG. 2 to be described later, when the number of pulses in the pulse signal being supplied to the stepper motor 19 is zero, then, although as just specified at this time said stepper motor 19 positions said metering element 18 quite close to said jet element 17, said jet element 17 is nevertheless not fully intercepted or closed off thereby, but a certain minimum fuel flow Gfmin is allowed to flow therethrough according to this minimum opening that the variable jet device 16 is thus set to. In other words, in no operating conditions is the variable jet device 16 fully closed, but instead its opening amount, which determines the amount of fuel flow through it, is controlled according to the number of pulses in the pulse signal supplied from the control system 40 to it, from a minimum non zero value to a maximum value in a substantially linear or proportional relationship.

Figure 2:
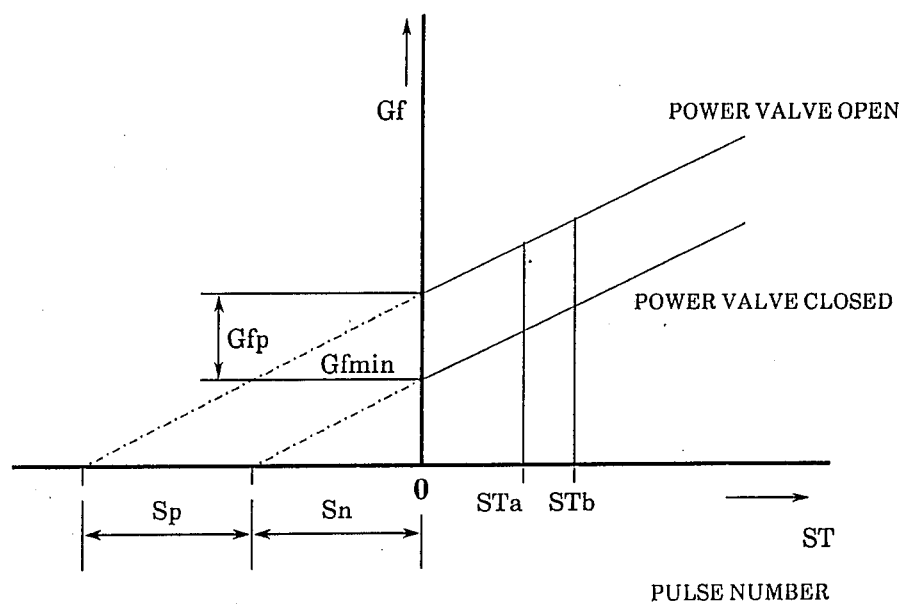
FIG. 2 is a graph showing the behavior of the FIG. 1 intake system, in which pulse number of the signal supplied to a controlling stepper motor is shown along the horizontal axis, and fuel supply amount is shown along the vertical axis.

As for the power fuel passage 13, the power valve 20 is provided for controlling said power fuel passage 13 in an ON/OFF fashion, and further the throttling element 21 is provided therein and is arranged to present a flow resistance such that, when said power valve 20 is open, the fuel flow amount in said power fuel passage 13 is equal to a predetermined value Gfp (again see FIG. 2). This power valve 20 is driven by a diaphragm device 23 via a drive lever 22. The diaphragm device 23 has a diaphragm chamber 24, and, when vacuum greater than a determinate value is supplied to said diaphragm chamber 24, said diaphragm device 23 closes the power valve 20, while on the other hand, when so such vacuum is supplied to said diaphragm chamber 24, said diaphragm device 23 correspondingly opens said power valve 20. The diaphragm chamber 24 is supplied via a conduit 25 with the fluid pressure presented at a port "a" of an electromagnetic switching valve 26. Another port "b" of said electromagnetic switching valve 26 is communicated to atmosphere, while a third port "c" of said valve 26 is supplied, via a conduit 27, a non return valve 28, and another conduit 29, with manifold vacuum taken out of the intake manifold 4 via a take out port 30. The electromagnetic switching valve 26 functions in the following way: when a solenoid (not shown) incorporated therein is not supplied with actuating electrical energy from the electrical control system 40, said valve 26 communicates its said port "a" with its said port "c" while isolating its said port "b"; while on the other hand, when said solenoid of said valve 26 is supplied with actuating electrical energy from said electrical control system 40, said valve 26 communicates its said port "a" with its said port "b" while isolating its said port "c". By this action, the electrical control system 40 is enabled either to open or to close the power valve 20.

The intake port 3 of this engine 1 is exemplarily structured as shown in Japanese Patent Laid Open Publication Ser. No. 58-23224 (1983), which again it is not hereby intended to admit as prior art to the present application except to the extent otherwise required by law. Said intake port 3 has a helical intake port passage portion and a straight intake port passage portion (neither of these are particularly shown in the figures) provided in parallel, with the straight passage portion being selectively opened and closed by the operation of a intake passage control valve 31; thus, this intake port 3 is a so called variable swirl type intake port. This intake passage control valve 31 is controlled to open and close by the operation of a diaphragm device 32 which has a diaphragm chamber 33. When vacuum greater than a determinate value is supplied to said diaphragm chamber 33, the diaphragm device 32 closes the intake passage control valve 31, thus intercepting the straight intake port passage portion of the intake port 3 and preventing mixture flow therethrough, and thus providing maximum swirl to the air-fuel mixture being sucked into the combustion chamber 2; while on the other hand, when no such vacuum is supplied to said diaphragm chamber 33, said diaphragm device 32 correspondingly opens said intake passage control valve 31, thus opening the straight intake port passage portion of the intake port 3 and allowing mixture flow therethrough, and thus providing only moderate swirl to the air-fuel mixture being sucked into the combustion chamber 2. The diaphragm chamber 33 of this diaphragm device 32 is supplied via a conduit 34 with the fluid pressure presented at a port "a" of an electromagnetic switching valve 35. Another port "c" of said electromagnetic switching valve 35 is communicated to atmosphere, while a third port "b" of said electromagnetic switching valve 35 is supplied, via a conduit 36, with manifold vacuum taken out of the intake manifold 4 through a take out port 37. The electromagnetic switching valve 35 functions in the following manner: when a solenoid (not shown) incorporated in said valve 35 is not supplied with actuating electrical energy from the electrical control system 40, then said valve 35 communicates its said port "a" with its said port "c" while isolating its said port "b"; while, when said solenoid of said electromagnetic switching valve 35 is supplied with actuating electrical energy from said electrical control system 40, then said valve 35 communicates its said port "a" with its said port "b" while isolating its said port "c". Accordingly, the electrical control system 40 is enabled either to open or to close the intake passage control valve 31, thereby to control the amount of swirling imparted to the air-fuel mixture sucked into the combustion chamber 2 of the internal combustion engine 1.

The electrical control system 40 will now be described with regard to its function; as for its actual detailed structure, based upon the disclosure herein, various possible such structures will be easily apparent to one of ordinary skill in the art without undue experimentation. In the presently described preferred embodiment, said electrical control system 40 incorporates a microcomputer and associated circuitry such as A/D converters and D/A converters and the like, and receives: a signal representative of intake manifold pressure, outputted from a pressure sensor 41 mounted to the intake manifold 4; a signal representative of crankshaft angle, outputted from a crank angle sensor 42 mounted to the distributor (not particularly shown) of the engine 1; a signal representative of engine coolant temperature, outputted from an engine coolant temperature sensor 43 mounted to the engine block (not particularly shown either); a signal representative of intake air temperature, outputted from an intake air temperature sensor 44 mounted to the mixer device 5 at its upstream side; and a signal representative of exhaust gas air/fuel ratio, outputted from an exhaust gas air/fuel ratio sensor 45 mounted to the exhaust manifold 38 of the engine 1. Based upon the current values of these signals, as will be explained shortly, the electrical control system 40 performs various calculations, and then outputs control signals to control the pulse count of the signal dispatched to the stepper motor 19 of the variable jet device 16, to control the electromagnetic switching valve 26 for controlling the power valve 20, and to control the other electromagnetic switching valve 35 for controlling the intake passage control valve 31.

The control thus performed by the electrical control system 40 for the electromagnetic switching valve 26 for controlling the power valve 20 may be performed for example based upon engine load, and may be as follows: when the value of intake manifold pressure, as measured by the signal outputted from the pressure sensor 41 therefor mounted to the intake manifold 4, is less than a certain determinate intake manifold pressure value, which is taken as indicative of low engine load operation, then electrical energy is not supplied to the electromagnetic switching valve 26, which accordingly causes the power valve 20 to be closed; but, when said measured value of intake manifold pressure comes to be greater than said certain determinate intake manifold pressure value, then this is taken as indicative of high load engine operation, and now electrical energy is supplied to said electromagnetic switching valve 26, which accordingly causes the power valve 20 to be opened and extra fuel to be provided.

Further the control thus performed by the electrical control system 40 for the electromagnetic switching valve 35 for controlling the intake passage control valve 31 may be performed for example based upon the intake air flow rate, and may be as follows: when the value of intake manifold pressure (depression) as measured by the signal outputted from the pressure sensor 41 therefor mounted to the intake manifold 4 is less than a certain determinate intake manifold pressure (depression) value, or when the rotational speed of the crankshaft as determined from the signal outputted from the crank angle sensor 42 mounted to the engine distributor is less than a certain determinate crankshaft rotational speed value, electrical energy is supplied to the electromagnetic switching valve 35, which accordingly causes the intake passage control valve 31 to be closed and high intake swirl to be provided for the air-fuel mixture being sucked into the combustion chamber 2 of the engine 1; but, when said measured value of intake manifold pressure (depression) comes to be greater than said certain determinate intake manifold pressure (depression) value, or when said determined value of crankshaft rotational speed comes to be greater than said certain determinate crankshaft rotational speed value, then this is taken as indicative of high intake air flow rate engine operation, and electrical energy is supplied to said electromagnetic switching valve 35, which accordingly causes the intake passage control valve 31 to be opened and low intake swirl to be provided for the air-fuel mixture being sucked into the combustion chamber 2 of the engine 1.

Figure 3:
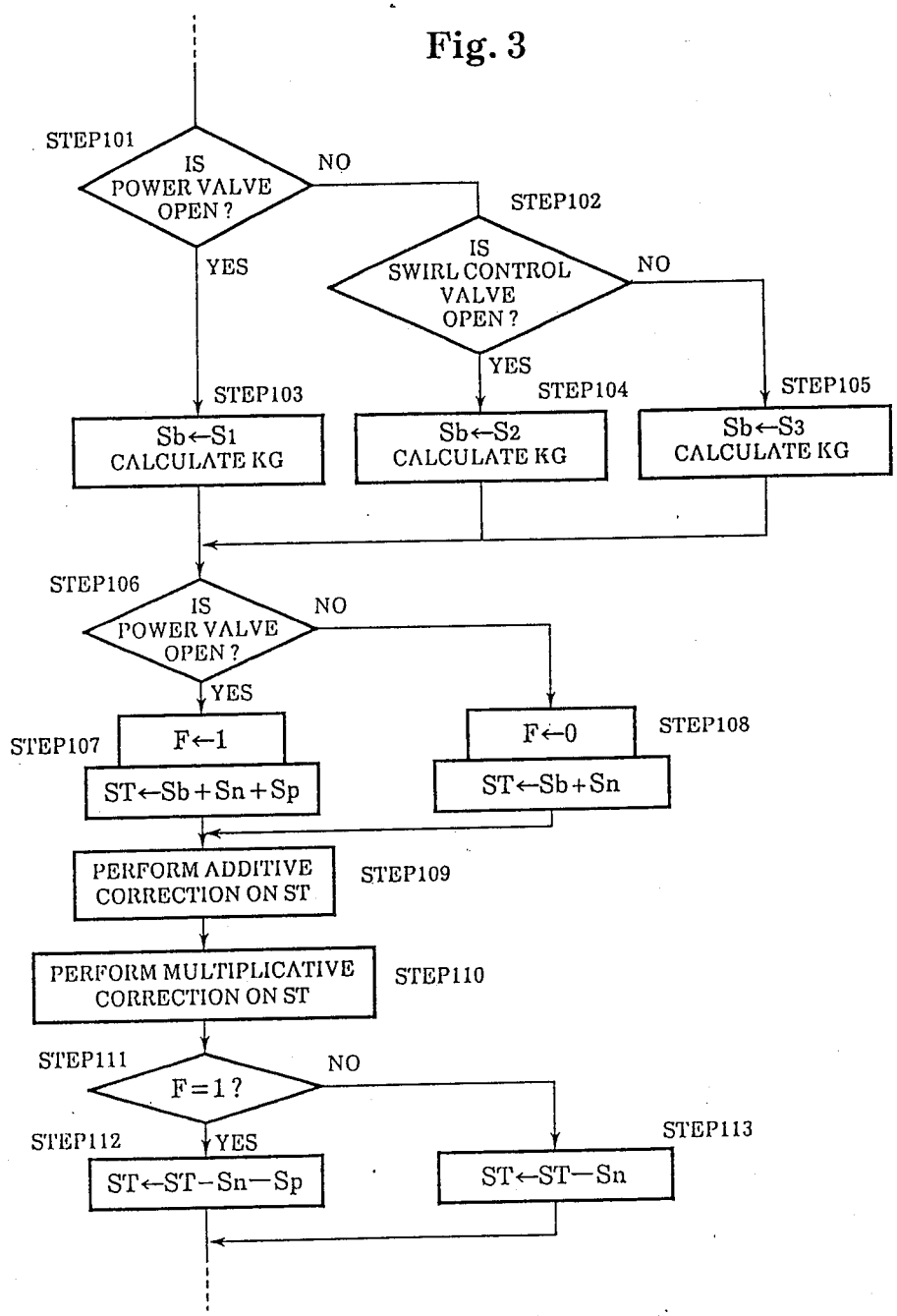
FIG. 3 is a fragmentary flow chart for illustrating the operation of the relevant portion of a program directing the operation of a microcomputer incorporated in an electrical control system of said preferred embodiment.

The present invention is particularly related to the control of the pulse count of the signal dispatched from the electrical control system 40 to the stepper motor 19 of the variable jet device 16 to control the opening of the jet element 17 thereof so as to regulate the amount of main fuel supplied into the intake manifold 4 and thus to the engine 1. This pulse count value will hereinafter be designated as ST, and is calculated as shown in the fragmentary flow chart of FIG. 3, which illustrates the operation of the relevant portion of a program directing the operation of a microcomputer incorporated in the electrical control system 40 of this preferred embodiment of the fuel supply control system of the present invention.

First, in the step 101, a decision is made as to whether or not the power valve 20 is currently opened (the power valve 20 has been set to be opened or closed according to the action of some previous program segment, not shown but functionally described above). If the answer to this decision is YES, then control is transferred to the step 103, in which a value S1 is assigned to an intermediate variable Sb, which represents the basic pulse count value. The value S1 in this case is read out, upon an unconditional basis, from a first table stored in advance, for example in a ROM (read only memory) of the microcomputer; such a table lists values of S1 depending upon intake manifold pressure as determined from the output signal of the pressure sensor 41 therefor and upon engine revolution speed as determined from the output signal of the crank angle sensor 42 therefor. On the other hand, if the answer to the step 101 decision is NO, then control is transferred to the step 102, in which a decision is made as to whether or not the intake passage control valve 31 is currently opened (again according to the action of a previous program segment, not shown but described above). If the answer is YES, then control is transferred to the step 104, in which a value S2 is assigned to the aforesaid intermediate variable Sb; similarly, the value S2 is read out upon an unconditional basis from a second table stored in advance in said read only memory, similarly listing values of the value S2 against intake manifold pressure and engine revolution speed. On the other hand, if the answer to this step 102 decision is NO, then control is transferred to the step 105, in which a value S3 is assigned to the aforesaid intermediate variable Sb; similarly, the value S3 is read out upon an unconditional basis from a third table stored in advance in said read only memory, again listing values of the value S3 against intake manifold pressure and engine revolution speed. Thus, the value of the intermediate variable Sb is set according to the air/fuel ratio required according to the current values of intake manifold pressure and engine revolution speed, and according to the current opened/closed conditions of the power valve 20 and of the intake passage control valve 31. In any of these cases, next the flow of control passes to the step 106.

In this step 106, again a decision is made as to whether or not the power valve 20 is currently opened. If the answer to this decision is NO, then control is transferred to the step 108, in which a flag F is set to the value zero and then the value Sb+Sn is assigned to the variable ST, which after further adjustment will be the final pulse count value for the stepper motor 19. The value Sb is the basic pulse count value as just calculated; and the value Sn, which is a constant value, is a virtual zero point correction as indicated in FIG. 2; in other words, Sn represents the number of pulses for the stepper motor 19 that would be required on a proportional basis to provide the initial or zero point amount of fuel flow through the jet element 17 of the variable jet device 16 which in fact is in any case present when no pulses at all are being supplied to said stepper motor 19. Then control is transferred to the step 109.

On the other hand, if the answer to the step 106 decision is YES, then control is transferred to the step 107, in which the flag F is set to the value unity and then the value Sb+Sn+Sp is assigned to the variable ST. As before, the value Sb is the basic pulse count value as just calculated, and the constant value Sn is the same virtual zero point correction as before for the zero point fuel flow amount of the variable jet device 16; while the value Sp, which again is a constant value and is as indicated in FIG. 2, is another virtual zero point correction for the amount of fuel that, when the power valve 20 is open, passes through the power fuel passage 13 and via the throttling element 21 and said power valve 20. In other words, Sp represents the number of pulses for the stepper motor 19 that would be required (again on a proportional basis) to provide the amount of fuel flow which takes place through the power valve 20 and the power fuel passage 13 when said power valve 20 is open. After this step 107, again control is transferred to the step 109.

In the step 109, one or more additive correction calculations are performed on the value of ST. For instance, an amount Saf corresponding to air/fuel ratio feedback correction can be added to ST, for example. Also, various other additive correction calculations can be made to ST, such as for example adding a value Si corresponding to power valve opening or closing transient correction and optionally further corresponding to other corrections. Then control is transferred next to the step 110.

In the step 110, next one or more multiplicative correction calculations are performed on the value of ST, as previously corrected by the above described additive correction or corrections. For instance, ST can be multiplied by an amount Fat which is an intake air temperature correction coefficient, determined according to the signal representative of intake air temperature outputted from the intake air temperature sensor 44 mounted to the mixer device 5, for example. Further, ST can be multiplied by an amount KG which is an air/fuel ratio learning coefficient, for example. Also, various other multiplicative correction calculations can be made to ST, such as for example multiplying it by a value Fi corresponding to coolant temperature as determined according to the signal representative thereof outputted from the engine coolant temperature sensor 43 mounted to the engine block, and optionally further corresponding to other corrections such as for example a transient driving correction and the like. Then control is transferred next to the step 111.

In this step 111, a decision is made as to whether or not the flag F is currently set to unity, i.e. as to whether, respectively, the amount Sn+Sp or Sn was added to the value of Sb in the step 108 or 107 respectively, in order to produce the initial value of ST before the above additive and multiplicative corrections. If the answer to this decision is NO, then control is transferred to the step 113, in which the value of Sn is subtracted from the value of the variable ST as calculated in the steps 109 and 110. Thus, the constant virtual zero point correction Sn as indicated in FIG. 2, which was initially added in the step 108, is now subtracted from the value of the count ST for the pulses to be outputted to the stepper motor 19; in other words, this number of pulses Sn for the stepper motor 19 are dispensed with, since they are not required due to the existence of the initial or zero point amount of fuel flow through the jet element 17 of the variable jet device 16 which is present when no pulses at all are being supplied to said stepper motor 19. Then control is transferred to leave this program fragment. It should be noted that the effects of this step 113 do not exactly cancel out the effects of the previous step 108 which was executed, however, because of the performance of the multiplicative corrections in the step 110 as described above. This is the essential point of the present invention.

On the other hand, if the answer to the step 111 decision is YES, then control is transferred to the step 112, in which the value Sn+Sp is subtracted from the value of the variable ST as calculated in the steps 109 and 110. Thus, the total constant virtual zero point correction Sn+Sp as indicated in FIG. 2, this time including both the previous constant virtual zero point correction Sn and also the power fuel zero point correction Sp, which was initially added in the step 108, is now subtracted from the value of the count ST for the pulses to be outputted to the stepper motor 19; in other words, this number of pulses Sn+Sp for the stepper motor 19 are dispensed with, since they are not required due to the existence of the initial or zero point amount of fuel flow through the jet element 17 of the variable jet device 16 which is present when no pulses at all are being supplied to said stepper motor 19, and also due to the existence of fuel flow through the power valve 20 and the power fuel passage 13 at this time since the power valve 20 is now open. Then, again, control is transferred to leave this program fragment. It should be noted that the effects of this step 112 do not exactly cancel out the effects of the previous step 107 which was executed, again because of the performance of the multiplicative corrections in the step 110 as described above.

To express this calculation process in pseudo mathematical terms, the pulse count ST for the stepper motor 19 in this preferred embodiment of the system of the present invention is (exemplarily) calculated as follows, according to the basic principle of the present invention:

If the power valve 20 is closed, then $$ST = KG \cdot Fat \cdot Fi \cdot (Sb + Si + Saf + Sn) - Sn \quad (1)$$

Whereas, if the power valve 20 is open, then:

$$ST = KG \cdot Fat \cdot Fi \cdot (Sb + Si + Saf + Sn + Sp) - Sn - Sp \quad (2)$$

In these formulas:
ST is the number of pulses to be outputted to the stepper motor 19;
KG is an air/fuel ratio learning multiplicative coefficient;
Fat is an intake air temperature correction multiplicative coefficient;

Fi represents one or more multiplicative correction factors, such as for example a coolant temperature correction, a transient driving correction, and the like;

Si represents one or more additive correction factors, such as for example a power valve opening/shutting transient correction or the like;

Saf is an air/fuel ratio feedback additive correction;

Sb is a basic pulse count, determined for example as described above by table lookup from one of three tables of pulse count (determined by required air/fuel ratio) against intake manifold pressure and engine revolution speed, according as to whether the power valve 20 and the intake passage control valve 31 are or are not opened;

Sn is the virtual zero point correction, described above, for correcting for the opening amount of the variable jet device 16 when the pulse number of the signal being supplied thereto is zero; and Sp is the power virtual zero point correction, described above, for correcting for the flow through the power valve 20 when it is open.

Referring to FIG. 2, the virtual zero point correction Sn is the number of pulses, virtually speaking, to take the variable jet device 16 from an actually fully closed condition to a condition of passing the amount, denoted by Gfmin, of fuel flow that said variable jet device 16 actually passes when no pulses are being supplied to said variable jet device 16; and similarly the power virtual zero point correction Sp is the number of pulses required to increase flow through said variable jet device 16 by an amount corresponding to the flow amount Gfp through the power valve 20 when said power valve 20 is opened, said flow amount Gfp of course depending upon the design of the fuel supply device.

The air/fuel ratio A/F is (the total air intake Ga)/(the total fuel amount Gf), and thus Gf is proportional to 1/(A/F). To find 1/(A/F) from the pulse number ST, see FIG. 2. Thus, the actual characteristics of the pulse number ST with respect to the total fuel amount Gf are extended to the virtual point where Gf=0; and, with the pulse count difference for the fuel flow Gfmin through the variable jet device 16 at its minimum opening being Sn and the pulse count difference for the fuel flow Gfp through the power valve 20 when opened being Sp as explained above: when said power valve 20 is closed the total fuel amount Gf corresponds to Sb+Sn, while when said power valve 20 is open said total fuel amount Gf corresponds to Sb+Sn+Sp. Thus, it is possible to obtain a valve corresponding to the total amount of fuel supplied, i.e. the actual physical amount can be determined. This actual value is the one which is to be used for learning control, allowing for manufacturing tolerances, changes over service life, alterations due to weather conditions, and other multiplicative corrections, and this is done as explained above. Finally, of course, the same virtual amount correction, either Sb+Sn or Sb+Sn+Sp respectively, must be applied to the corrected fuel amount, to obtaim the number of pulses actually to be dispatched to the stepper motor 19 for appropiately driving the variable jet device 16.

For feedback control of the exemplary type utilized in this preferred embodiment of the system of the present invention, if the required pulse count ST is not the initially set value STa corresponding to Sb determined according to engine operational parameters in the preceding control routine, but STb determined from the actual air/fuel ratio detected by the air/fuel ratio detector, then:

$$KG = (STb + Sn + Sp)/(STa + Sn + Sp)$$

(if and only if the power valve 20 is open) and learning control using this air/fuel ratio learning value KG is done, not only of course during feedback control when the power valve 20 is open, but also during open loop control when said power valve 20 is closed. Thus, the learning control by closed loop feedback control is performed only during operational periods when the power valve 20 is open, and the value derived therefrom is utilized for open loop control during other operational periods when said power valve 20 is closed. Thus, the appropriate amount of fuel is always provided, despite the adverse influences of manufacturing tolerances, changes over service life, alterations due to weather conditions, and the like, under substantially all operational conditions.

Although the present invention has been shown and described in terms of the preferred embodiments of the system and the method thereof, and with reference to the appended drawings, it should not be considered as being particularly limited thereby. The details of any particular embodiment, or of the drawings, could be varied without, in many cases, departing from the ambit of the present invention. Accordingly, the scope of the present invention is to be considered as being delimited, not by any particular perhaps entirely fortuitous details of the disclosed preferred embodiments, or of the drawings, but solely by the legitimate and properly interpreted scope of the accompanying claims, which follow.

What is claimed is:

1. A method for controlling an internal combustion engine fuel supply system comprising:

(a) an intake passage;

(b) a main fuel conduit which supplies fuel into said intake passage to be mixed with air flowing therethrough to provide air-fuel mixture for said internal combustion engine;

(c) means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;

(d) a power fuel conduit which selectively supplies fuel into said intake passage to be mixed with said air flowing therethrough; and:

(e) a means for regulating said power fuel conduit to be either open or closed, according to the value of a power fuel conduit control signal; comprising the steps of:

(f) when said power fuel conduit is closed:

(f1) determining a basic value Sb for said main fuel conduit control signal according to engine operational parameters;

(f2) adding a value Sn to said basic value Sb;

(f3) applying a multiplicative correction to the result of step f2; and:

(f4) determining the value for said main fuel conduit control signal by subtracting said value Sn from the result of step f3; and:

when said power fuel conduit is open:

(g1) determining a basic value Sb for said main fuel conduit control signal according to engine operational parameters;

(g2) adding said value Sn and a value Sp to said basic value Sb;

(g3) applying a multiplicative correction to the result of step g2; and (g4) determining the value for said main fuel conduit control signal by subtracting said value Sn and said value Sp from the result of step g3;

(h) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

2. A control method according to claim 1, wherein the relationship between said fuel flow through said main fuel conduit and the value of said main fuel conduit control signal is substantially linear.

3. A control method according to claim 1, wherein further in the step f2 and in the step g2 other additive corrections are applied to said basic value Sb.

4. A control method according to claim 1, wherein further in the step f3 and in the step g3 other multiplicative corrections are applied to the results of steps f2 and g2 respectively.

5. A method for controlling an internal combustion engine fuel supply system comprising:

(a) an intake passage;

(b) a main fuel conduit which supplies fuel into said intake passage to be mixed with air flowing therethrough to provide air-fuel mixture for said internal combustion engine;

(c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;

(d) a power fuel conduit which selectively supplies fuel into said intake passage to be mixed with said air flowing therethrough;

(e) a means for regulating said power fuel conduit to be either open or closed, according to the value of a power fuel conduit control signal; and (f) a means for detecting air/fuel ratio of the air-fuel mixture of said internal combustion engine and for outputting a signal representative thereof;

comprising steps of:

(g) when said power fuel conduit is closed:

(g1) determining a basic value Sb for said main fuel conduit control signal according to engine operational parameters;

(g2) adding a value Sn to said basic value Sb;

(g3) applying a multiplicative correction to the result of step g2; and (g4) determining the value for said main fuel conduit control signal by subtracting said value Sn from the result of step g3;

(h) when said power fuel conduit is open:

(h1) determining a basic value Sb for said main fuel conduit control signal according to engine operational parameters;

(h2) adding said value Sn and a value Sp to said basic value Sb;

(h3) applying a multiplicative correction to the result of step h2; and (h4) determining the value for said main fuel conduit control signal by subtracting said value Sn and said value Sp from the result of step h3; and (i) in step (g), determining a further value STb for said basic value Sb by using the output signal of said air/fuel ratio detecting means, adding said value Sn to said further value STb, obtaining a learning correction coefficient by dividing the thus obtained resultant value of addition by the resultant value of step (g2), and using said learning correction coefficient in step (g3) as a further multiplicative coefficient for the result of the previous step; and/or in step (h), determining a further value STb for said basic value Sb by using the output signal of said air/fuel ratio detecting means, adding said value Sn and also said value Sp to said further value STb, obtaining a learning correction coefficient by dividing the thus obtained resultant value of addition by the resultant value of step (h2), and using said learning correction coefficient in step (h3) as a further multiplicative coefficient for the result of the previous step;

(j) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

6. A control method according to claim 5, wherein the relationship between said fuel flow through said main fuel conduit and the value of said main fuel conduit control signal is substantially linear.

7. A control method according to claim 5 wherein further in the step g2 and in the step h2 other additive corrections are applied to said basic value Sb.

8. A control method according to claim 5, wherein further in the step g3 and in the step h3 other multiplicative corrections are applied to the results of steps g2 and h2 respectively.

9. A method for controlling an internal combustion engine fuel supply system comprising:

(a) an intake passage;

(b) a main fuel conduit which supplies fuel into said intake passage to be mixed with air flowing therethrough to provide air-fuel mixture for said internal combustion engine;

(c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;

(d) a power fuel conduit which selectively supplies fuel into said intake passage to be mixed with said air flowing therethrough;

(e) a means for regulating said power fuel conduit to be either open or closed, according to the value of a power fuel conduit control signal; and (f) a means for detecting air/fuel ratio of the air-fuel mixture of said internal combustion engine and for out-putting a signal representative thereof;

comprising steps of:

(g) when said power fuel conduit is closed:
  (g1) determining a basic value Sb for said main fuel conduit control signal according to engine operational parameters;
  (g2) adding a value Sn to said basic value Sb;
  (g3) applying a multiplicative correction to the result of step g2; and
  (g4) determining the value for said main fuel conduit control signal by subtracting said value Sn from the result of step g3;

(h) when said power fuel conduit is open:
  (h1) determining a basic value Sb for said main fuel conduit control signal according to engine operational parameters;
  (h2) adding said value Sn and a value Sp to said basic value Sb;
  (h3) applying a multiplicative correction to the result of step h2; and
  (h4) determining the value for said main fuel conduit control signal by subtracting said value Sn and said value Sp from the result of step h3;

(i) in step (g), determining a further value STb for said basic value Sb by using the output signal of said air/fuel ratio detecting means, adding said value Sn to said further value STb, and obtaining a learning correction coefficient by dividing the thus obtained resultant value of addition by the resultant value of step (h2); or in step (h), determining a further value STb for said basic value Sb by using the output signal of said air/fuel ratio detecting means, adding said values Sn and also said value Sp to said further value STb, and obtaining a learning correction coefficient by dividing the thus obtained resultant value of addition by the resultant value step (h2); and (j) using said learning correction coefficient both in the step (g3) and step (h3) as a further multiplicative coefficient for the result of the previous step;

(k) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

10. A control method according to claim 9, wherein the relationship between said fuel flow through said main fuel conduit and the value of said main fuel conduit control signal is substantially linear.

11. A control method according to claim 9 or claim 10, wherein said learning correction coefficient of step (i) is only obtained in step (g).

12. A control method according to claim 9, wherein further in the step g2 and in the step h2 other additive corrections are applied to said basic value Sb.

13. A control method according to claim 9, wherein further in the step g3 and in the step h3 other multiplicative corrections are applied to the results of steps g2 and h2 respectively.

14. A control method according to claim 11, wherein further in the step g2 and in the step h2 other additive corrections are applied to said basic value Sb.

15. A control method according to claim 11, wherein further in the step g3 and in the step h3 other multiplicative corrections are applied to the results of steps g2 and h2 respectively.

16. A system for controlling an internal combustion engine fuel supply system comprising:
  (a) an intake passage;
  (b) a main fuel conduit which supplies fuel into said intake passage to be mixed with air flowing therethrough to provide air-fuel mixture for said internal combustion engine;
  (c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;
  (d) a power fuel conduit which selectively supplies fuel into said intake passage to be mixed with said air flowing therethrough; and:
  (e) a means for regulating said power fuel conduit to be either open or closed, according to the value of a power fuel conduit control signal; comprising:
  (f) a means for, when said power fuel conduit is closed:
    (f1) determining a basic value Sb for said main fuel conduit control signal according to engine operational parameters;
    (f2) adding a value Sn to said basic value Sb;
    (f3) applying a multiplicative correction to the result of step f2; and:
    (f4) determining the value for said main fuel conduit control signal by subtracting said value Sn from the result of step f3; and:
  (g) a means for, when said power fuel conduit is open:
    (g1) determining a basic value Sb for said main fuel conduit control signal according to engine operational parameters;
    (g2) adding said value Sn and a value Sp to said basic value Sb;
    (g3) applying a multiplicative correction to the result of step g2; and:
    (g4) determining the value for said main fuel conduit control signal by subtracting said value Sn and said value Sp from the result of step g3;
  (h) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

17. A control system according to claim 16, wherein the relationship between said fuel flow through said main fuel conduit and the value of said main fuel conduit control signal is substantially linear.

18. A control system according to claim 16, further comprising a means for, in the step f2 and in the step g2, applying other additive corrections to said basic value Sb.

19. A control system according to claim 16, further comprising a means for, in the step f3 and in the step g3, applying other multiplicative corrections to the results of steps f2 and g2 respectively.

20. A method for controlling an internal combustion engine fuel supply system comprising:
   (a) an intake passage;
   (b) a main fuel conduit which supplies fuel into said intake passage to be mixed with air flowing therethrough to provide air-fuel mixture for said internal combustion engine;
   (c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;
   (d) a power fuel conduit which selectively supplies fuel into said intake passage to be mixed with said air flowing therethrough;
   (e) a means for regulating said power fuel conduit to be either open or closed, according to the value of a power fuel conduit control signal; and
   (f) a means for detecting air/fuel ratio of the air-fuel mixture of said internal combustion engine and for outputting a signal representative thereof; comprising:
   (g) a means for, when said power fuel conduit is closed:
      (g1) determining a basic value Sb for said main fuel conduit control signal according to engine operational parameters;
      (g2) adding a value Sn to said basic value Sb;
      (g3) applying a multiplicative correction to the result of step g2; and
      (g4) determining the value for said main fuel conduit control signal by subtracting said value Sn from the result of step g3;
   (h) a means for, when said power fuel conduit is open;
      (h1) determining a basic value Sb for said main fuel conduit control signal according to engine operational parameters;
      (h2) adding said value Sn and a value Sp to said basic value Sb;
      (h3) applying a multiplicative correction to the result of step h2; and
      (h4) determining the value for said main fuel conduit control signal by subtracting said value Sn and said value Sp from the result of step h3; and
   (i) in means (g), a means for determining a further value STb for said basic value Sb by using the output signal of said air/fuel ratio detecting means, adding said value Sn to said further value STb, obtaining a learning correction coefficient by dividing the thus obtained resultant value of addition by the resultant value of step (g2), and using said learning correction coefficient in step (g3) as a further multiplicative coefficient for the result of the previous means; and/or in means (h), a means for determining a further value STb for said basic value Sb by using the output signal of said air/fuel ratio detecting means, adding said value Sn and also said value Sp to said further value STb, obtaining a learning correction coefficient by dividing the thus obtained resultant value of addition by the resultant value from step (h2), and using said learning correction coefficient in step (h3) as a further multiplicative coefficient for the result of the previous step;
   (j) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

21. A control system according to claim 20, wherein the relationship between said fuel flow through said main fuel conduit and the value of said main fuel conduit control signal is substantially linear.

22. A control system according to claim 20, further comprising a means for, in the step g2 and in the step h2, applying other additive corrections to said basic value Sb.

23. A control system according to claim 20, further comprising a means for, in the step g3 and in the step h3, applying other multiplicative corrections to the results of means g2 and h2 respectively.

24. A system for controlling an internal combustion engine fuel supply system comprising:
   (a) an intake passage;
   (b) a main fuel conduit which supplies fuel into said intake passage to be mixed with air flowing therethrough to provide air-fuel mixture for said internal combustion engine;
   (c) a means for regulating fuel flow through said main fuel conduit through a range of values according to the value of a main fuel conduit control signal, the fuel flow provided through said main fuel conduit when said main fuel conduit control signal is substantially zero being a determinate basic value substantially greater than zero;
   (d) a power fuel conduit which selectively supplies fuel into said intake passage to be mixed with said air flowing therethrough;
   (e) a means for regulating said power fuel conduit to be either open or closed, according to the value of a power fuel conduit control signal; and
   (f) a means for detecting air/fuel ratio of the air-fuel mixture of said internal combustion engine and for outputting a signal representative thereof; comprising:
   (g) a means for, when said power fuel conduit is closed:
      (g1) determining a basic value Sb for said main fuel conduit control signal according to engine operational parameters;
      (g2) adding a value Sn to said basic value Sb;
      (g3) applying a multiplicative correction to the result of step g2; and
      (g4) determining the value for said main fuel conduit control signal by subtracting said value Sn from the result of step g3;

(h) a means for, when said power fuel conduit is open:
- (h1) determining a basic value Sb for said main fuel conduit control signal according to engine operational parameters;
- (h2) adding said value Sn and a value Sp to said basic value Sb;
- (h3) applying a multiplicative correction to the result of step h2; and
- (h4) determining the value for said main fuel conduit control signal by subtracting said value Sn and said value Sp from the result of step h3; and (i) in means (g), a means for determining a further value STb for said basic value Sb by using the output signal of said air/fuel ratio detecting means, adding said value Sn to said further value STb, obtaining a learning correction coefficient by dividing the thus obtained resultant value of addition by the resultant value of step (g2); or, in means (h), a means for determining a further value STb for said basic value Sb by using the output signal of said air/fuel ratio detecting means, adding said value Sn and also said value Sp to said further value STb, and obtaining a learning correction coefficient by dividing the thus obtained resultant value of addition by the resultant value of step (h2); and (j) a means for using said learning correction coefficient both in the step (g3) and step (h3) as a further multiplicative coefficient for the result of the previous step;

(k) where said value Sn represents the value of said main fuel conduit control signal which would be required, in a virtual sense, for providing said determinate basic main fuel conduit flow value from a zero flow value, and said value Sp represents the incremental value of said main fuel conduit control signal which would be required to increase the fuel flow amount through said main fuel conduit by an amount corresponding to the fuel flow through said power fuel conduit when it is open.

25. A control system according to claim 24, wherein the relationship between said fuel flow through said main fuel conduit and the value of said main fuel conduit control signal is substantially linear.

26. A control system according to claim 24 or claim 25, wherein said learning correction coefficient of means (i) is only obtained in means (g).

27. A control system according to claim 24, further comprising a means for, in the means g2 and in the means h2, applying other additive corrections to said basic value Sb.

28. A control system according to claim 24, further comprising a means for, in the means g3 and in the means h3, applying other multiplicative corrections to the results of means g2 and h2 respectively.

29. A control system according to claim 28, further comprising a means for, in the means g2 and in the means h2, applying other additive corrections to said basic value Sb.

30. A control system according to claim 28, further comprising a means for, in the means g3 and in the means h3, applying other multiplicative corrections to the results of means g2 and h2 respectively.

* * * * *